United States Patent [19]
Fujii

[11] Patent Number: 4,964,672
[45] Date of Patent: Oct. 23, 1990

[54] DASHBOARD SUPPORT CONSTRUCTION FOR COWL REGION OF A MOTOR CAR

[75] Inventor: Yoshio Fujii, Higashi-Hiroshima, Japan

[73] Assignee: Mazda Motor Corp., Japan

[21] Appl. No.: 386,927

[22] Filed: Jul. 28, 1989

[30] Foreign Application Priority Data

Jul. 28, 1988 [JP] Japan ................. 63-188879

[51] Int. Cl.⁵ ............................ B62D 25/08
[52] U.S. Cl. ................... 296/192; 296/194
[58] Field of Search ............ 296/192, 194, 70; 180/90

[56] References Cited

U.S. PATENT DOCUMENTS

| | | | |
|---|---|---|---|
| 4,332,187 | 6/1982 | Imai et al. | 296/192 |
| 4,699,419 | 10/1987 | Kawase et al. | 296/192 |
| 4,826,234 | 5/1989 | Komatsu | 296/70 |

FOREIGN PATENT DOCUMENTS

| | | | |
|---|---|---|---|
| 30469 | 2/1986 | Japan | 296/192 |
| 61-198180 | 12/1986 | Japan | |
| 62-103713 | 7/1987 | Japan | |

*Primary Examiner*—Robert R. Song
*Attorney, Agent, or Firm*—Thompson, Hine and Flory

[57] ABSTRACT

A cowl region construction of a motor car, particularly a construction of a joint of a roof pillar of closed sectional construction extending in a vertical direction and a dashboard support member of closed sectional construction extending in a longitudinal direction is disclosed. An opening is formed in the dashboard support member at the region where the dashboard support member and the roof pillar are joined and a cowl panel is arranged at the front side of the dashboard support member and is spot-welded to the roof pillar.

7 Claims, 4 Drawing Sheets

DASHBOARD SUPPORT CONSTRUCTION FOR COWL REGION OF A MOTOR CAR

BACKGROUND OF THE INVENTION

1. Field of the Invention

This invention relates to the cowl region construction of a motor car, and particularly the construction of the dashboard support member at the intersection between the roof pillars, cowl section and upper dash panel to provide one or more access points for spot welding.

2. Description of Prior Art

As shown by Japanese Utility Model Registration Application Laying Open Gazette No. 61-198180, for example, the connection between the engine compartment and passenger compartment at the cowl region is such that an end portion of a dashboard support forms a closed sectional constructuion extending in a longitudinal direction of a car body by its joining to an upper dash panel which partitions the engine compartment from the passenger compartment. The upper dash panel is joined to a roof pillar which forms a closed sectional construction extending in a vertical direction by the joining of roof pillar outer and roof pillar inner members.

However, since both the roof pillar and the dashboard support member form a closed sectional construction, when a cowl panel is joined to these members, spot-welding cannot be used to attach the cowl panel.

SUMMARY OF THE INVENTION

The present invention eliminates the above disadvantage, namely, the present invention has as its object to provide a dashboard support member which enables the roof pillar, upper dash panel and cowl panel to be spot welded in one or more places at the intersection of the roof pillar and the upper dash panel such that a desired joint strength can be obtained for the roof pillar and the cowl panel.

In order to attain the above object, the present invention comprises a roof pillar comprising a roof pillar inner member and a roof pillar outer member, said inner and outer members being joined to form a closed sectional construction extending in a vertical direction, a dashboard support member having an upper surface, a lower surface and a connecting perpendicular surface, the side edge of said dashboard support member being connected to said roof pillar along the vertical interior surface of said roof pillar, said dashboard support member further comprising an opening, an upper dash panel connected to said dashboard support along the longitudinal edges of said upper and lower surfaces of said dashboard support and to said roof pillar, and a cowl panel connected to paid upper dash panel along the upper longitudinal edge of said upper dash panel and to said roof pillar, wherein said opening of said dashboard support member enables said roof pillar, said cowl panel and said upper dash panel to be simultaneously spot welded together at one or more points through said opening.

Under the above arrangement, since the dashboard support member of closed sectional construction has an opening where it is joined to the front roof pillar, spot-welding of the front roof pillar and the cowl panel through the opening is possible without lowering the rigidity of the dashboard support member. Moreover, as the inside of the dashboard support member is open to the outside through the opening, it is possible to apply a sealing agent to the inside of the dashboard support member or to provide a sound insulating material in the interior of the dashboard support member.

Preferably, the opening of the dashboard support member is located at the front of the dashboard support member closest to the engine compartment and the cowl panel should overlap the area where the roof pillar faces the opening.

To facilitate spot-welding by which the desired joint strength can be secured by taking advantage of the opening, a roof pillar inner surface overlapped with the cowl panel and a pillar outer surface faces the opening of the dashboard support member. The cowl panel surface which faces the opening may be further overlapped with a cowl reinforcement member to increase the joint strength. Two openings may be provided, namely, an upper opening and a lower opening formed at the upper surface and the lower surface of the dashboard support member respectively. As a result, the dashboard support member is nearly C-shaped in cross section and has a perpendicular surface extending substantially in a perpendicular direction, an upper surface extending from the upper edge of the perpendicular surface toward the front of the car body and a lower surface extending from the lower edge of the perpendicular surface toward the front of the car body.

To facilitate the installation of a sound absorbing material in the closed sectional construction formed by the dashboard support member, and to avoid the sound absorbing material from falling out during installation, it is desirable to make the opening area of the upper panel larger than that of the lower panel.

The above and other objects and novel features of the present invention will become more apparent by reading the following detailed description, with reference to the accompanying drawings.

BRIEF DESCRIPTION OF THE DRAWINGS

The accompanying drawings show a preferred embodiment of the present invention, in which.

DETAILED DESCRIPTION OF THE INVENTION

A preferred embodiment of the present invention will be described below, with reference to the accompanying drawings.

Figure 1:
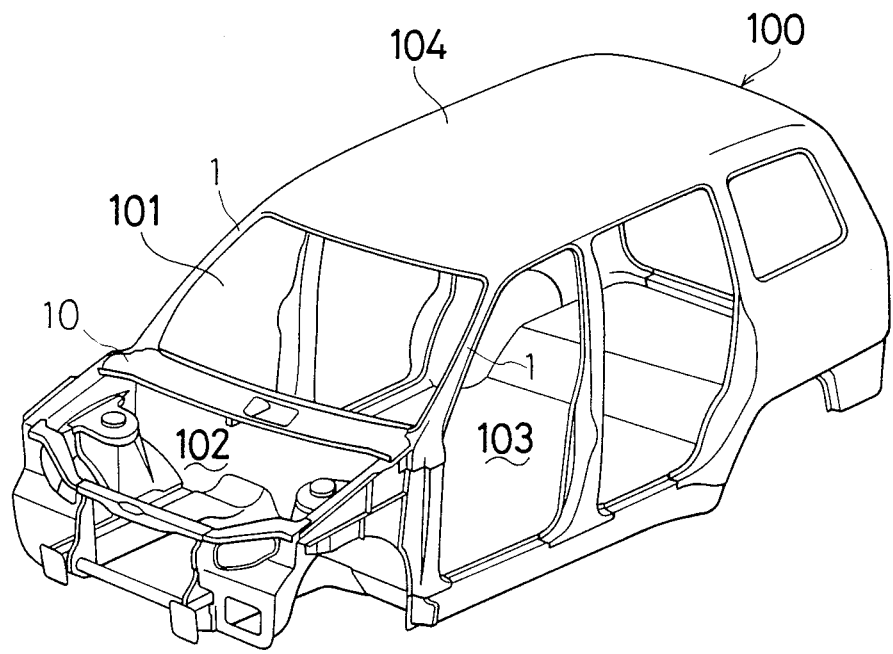
FIG. 1 is a perspective view of the body of a motor car.

As shown in FIG. 1, an opening 101 in which a front windshield (not shown in the drawing) is set is formed at a front part of a body 100 of a motor car. Right and left side edge portions of the opening 101 are formed by roof pillars 1 extending in a vertical direction. A cowl panel 10 is arranged at the lower front edge of the opening 101.

Figure 2:
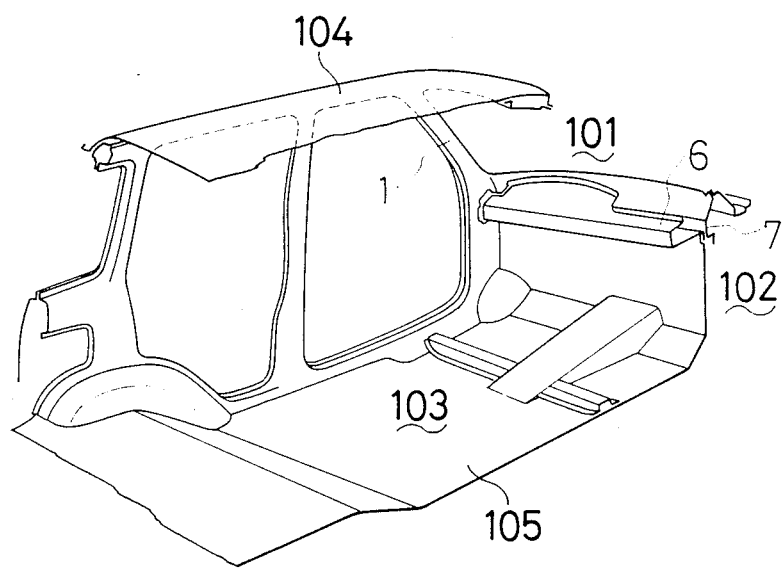
FIG. 2 is a perspective view of a body, partly broken away, of a motor car, as viewed from the passenger compartment.

Referring now to FIG. 2, a closed sectional construction extending in a longitudinal direction is formed by joining upper dash panel 7 which partitions the engine compartment 102 from passenger compartment 103 to dashboard support member 6. Dashboard support member 6 is substantially C-shaped in cross section and its side edge portion is joined to roof pillar 1. Reference numerals 104 and 105 designate a roof panel and a floor panel respectively.

Figure 3:
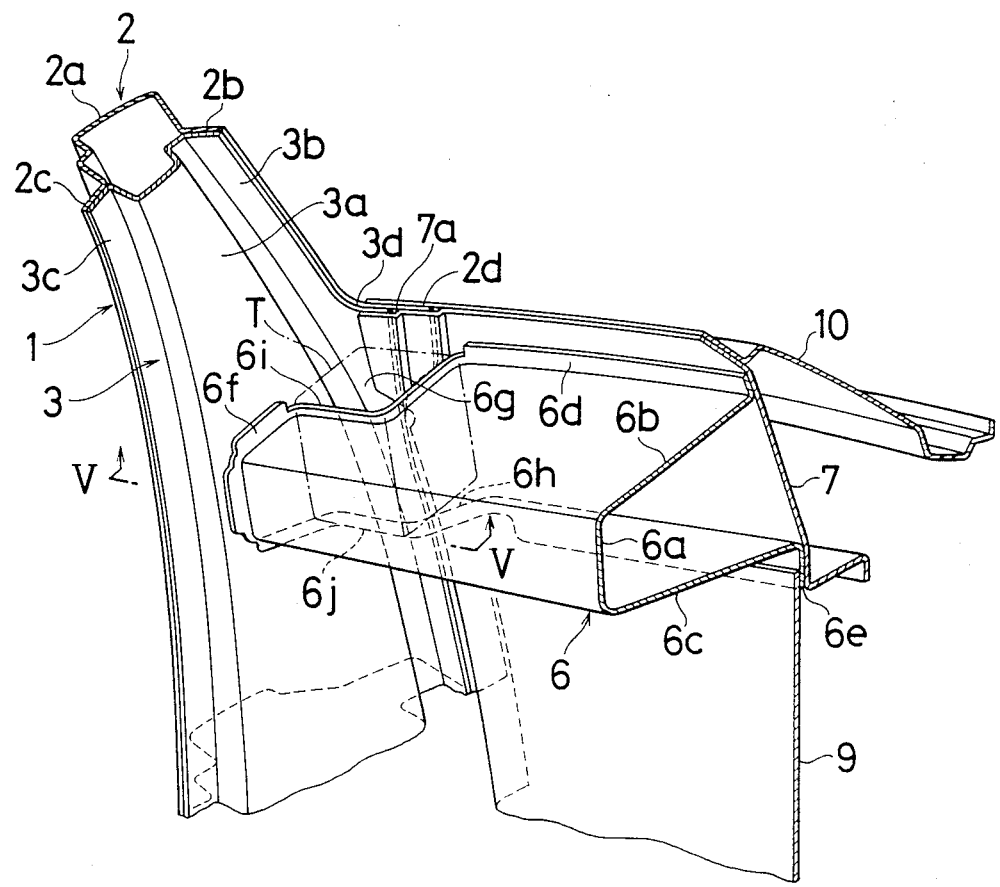
FIG. 3 is a perspective view from the passenger compartment showing the locations of a roof pillar, dashboard support member, upper dash panel, lower dash panel and cowl panel.
Figure 4:
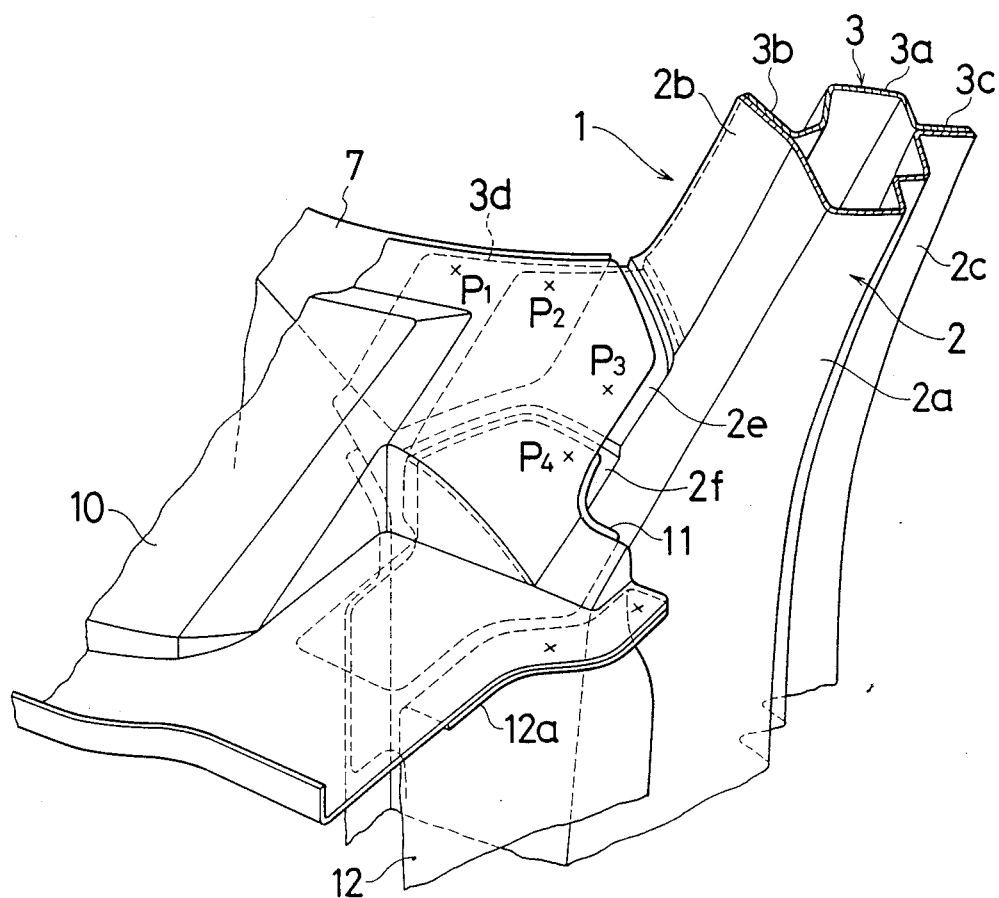
FIG. 4 is a perspective view from the exterior of the car showing the location of the roof pillar, upper dash panel, cowl panel and cowl panel reinforcement member.
Figure 5:
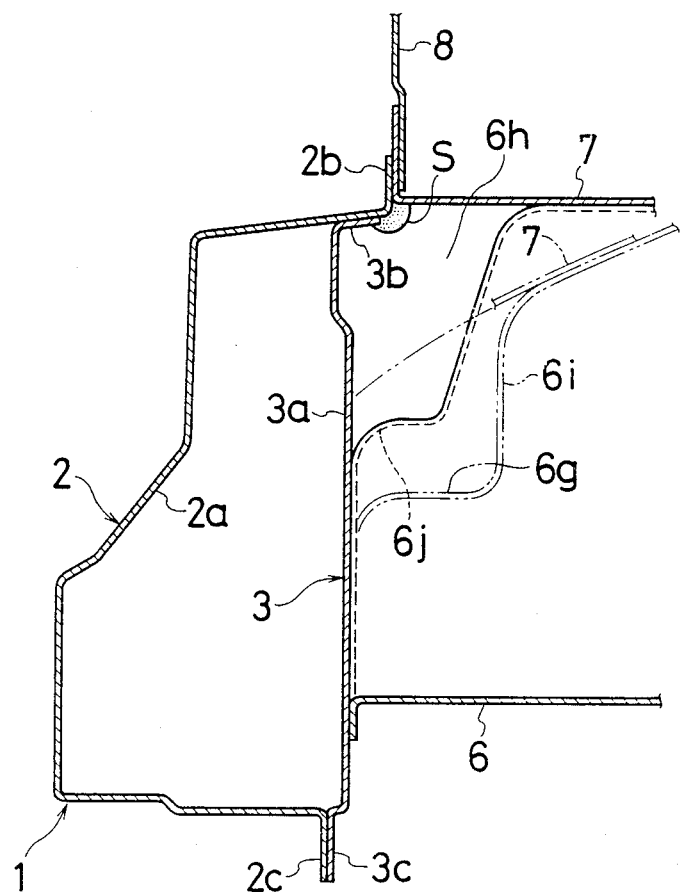
FIG. 5 is a cross section taken along the line V—V in FIG. 3.

As shown in FIGS. 3–5, roof pillar 1 comprises a pillar outer member 2 having a main body 2a and flange parts 2b, 2c at the front and rear edges thereof and a pillar inner member 3 having a main body 3a and flange parts 3b, 3c at the front and rear edge thereof. The flange part 3b of pillar inner member 3 is spot-welded to the flange part 2b of the pillar outer member 2, and the flange part 3c of pillar inner member 3 is spot-welded to the flange part 2c of the pillar outer member 2 to form a closed sectional construction.

The dashboard support member 6 comprises a surface 6a extending substantially in a direction, perpendicular to floor panel 105 (see FIG. 1) an upper surface 6b extending from an upper edge of the perpendicular surface 6a toward the front of a car body in a longitudinal direction, a lower surface 6c extending from a lower edge of the perpendicular surface 6a toward the front of a car body in a longitudinal direction, and flange parts 6d, 6e, each extending respectively in a vertical direction from the forward edges of the upper and lower surfaces 6b and 6c.

Flange parts 6d, 6e of the dashboard support member 6 are joined to the rear surface of the upper dash panel 7 to form a closed sectional construction extending in a longitudinal direction.

Dashboard support member 6 further comprises flange part 6f to be joined to the main body 3a of the pillar inner member 3 along the vertical interior edge of main body 3a, and openings 6g, 6h (upper and lower) are formed in dashboard support member 6 where it intersects main body 3a and flange part 3b. The opening 6g at the upper surface 6b is larger in area than the opening 6h at the lower surface 6c (refer to FIG. 5). Reinforcing flange parts 6i, 6j (of small height) extending in a vertical direction are provided at circumferential edges of openings 6g, 6h respectively. Extensions 2d, 3d which extend from the pillar outer member 2 and the pillar inner member 3 respectively are located between the upper dash panel 7 and the cowl panel 10. The extension 2d of the pillar outer member 2 is longer than the extension 3d of the pillar inner member 3. Flange 7a of upper dash panel 7 is fit into the region separating the lengths of extensions 2d and 3d. The dashboard support member 6 is to be covered with an instrument panel (not shown in the drawing).

As shonw in FIG. 5, the flange part 3b and the flanged part 3c are spot-welded to the main part 2a at the areas adjacent to the flange part 2b of the pillar outer member 2 and adjacent to the flange part 2c of the pillar outer member 2 respectively. The flange part 2b at the front side of the pillar outer member 2 is spot-welded to upper dash panel 7 and wheel apron 8 at point S. As shown in FIG. 3 an upper edge of lower dash panel 9 is joined to upper dash panel 7 along flange part 6e.

Referring to FIG. 4, concave part 2e is formed at the front external surface of the pillar outer member 2 of roof pillar 1. The lower dash panel 7 and cowl panel 10 are joined to this concave part 2e. Another concave part 2f is formed at the lower external surface of the concave part 2e and to this concave part 2f, cowl panel 10 and cowl reinforcement member 11 are joined.

Still referring to FIG. 4, an upper flange part 12a of a cowl side reinforcement member 12 is joined to a side edge of the cowl panel 10.

Using the above construction, the cowl panel 10 can be spot-welded to roof pillar 1 (the pillar outer member 2 and the pillar inner member 3), the upper dash panel 7 and the cowl reinforcement member 11 through the openings 6g, 6h. (Refer to weld points $P_1$, $P_2$, $P_3$ and $P_4$ in FIG. 4). Thus, weldability and precise alignment of these members are improved. At the weld point $P_1$, the flange part 3b (extension 3d) of the inner member 3, cowl panel 10 and upper dash panel 7 are joined together. At the weld point $P_2$, the flange part 2d (extension 2d) of the pillar outer member 2, the flange part 3b (the extension 3d) of the pillar inner member 3, cowl panel 10 and upper dash panel 7 are joined together. At the weld point $P_3$, the flange part 2b (extension 2c) of the pillar outer member 2, the flange part 3b (extension 3d) of the pillar inner member 3 and cowl panel 10 are joined together. At the weld point $P_4$, the flange part 2b (extension 2d) of the pillar outer member 2, the flange part 3d of the pillar inner member 3, cowl panel 10 and cowl reinforcement 11 are joined together.

Referring now to FIG. 5, sealing agent S can be applied to the joint between the pillar outer member 2 at flange 2b, pillar inner member 3 at flange 3b and upper dash panel 7 through opening portion 6g, for example to improve sealability. It is also possible to wire an antenna feeder line through the openings 6g, 6h and to make it parallel with the roof pillar 1. This antenna feeder line is to be covered with a trim.

Referring to FIG. 3, a sound absorbing material T (comprising a urethane foam of an ester, for example) which insulates abnormal sounds, such as engine sound can be arranged in the dashboard support member 6 through the openings 6g, 6h to improve sound absorptivity. In this case, since the opening 6g is larger in opening area than opening 6h, the sound insulating material T can easily be inserted into the dashboard support member 6. On the other hand, since opening 6h is smaller in opening area, the sound absorbing material T does not easily fall through opening 6h.

As the openings 6g, 6h are formed where the dashboard support member 6 and roof pillar 1 are joined, spot-welding of the cowl panel 10 to the roof pillar 1 is made possible. This improves weldability. In addition, since a sealing agent S may be applied through openings 6g, 6h, the sealability of these members can be improved.

As the present invention can be materialized in many modes without departing from its essential characteristics, the above embodiment is given solely for explanatory purposes and is not restrictive. Moreover, as the scope of the present invention is not based on the description prior to the claim but is limited by the claim, all changes in the requirements of the claim and equivalents to the requirements are included in the claim.

What is claimed is:

1. A cowl region construction of an automobile comprising:
    a roof pillar comprising a roof pillar inner member and a roof pillar outer member, said inner and outer members being joined to form a closed sectional construction extending in a vertical direction;

a dashboard support member having an upper surfaces, a lower surface and a connecting perpendicular surface, the side edge of said dashboard support member being connected to said roof pillar along the vertical interior surface of said roof pillar, said dashboard support member further comprising an opening;

an upper dash panel connected to said dashboard support along the longitudinal edges of said upper and lower surfaces of said dashboard support and to said roof pillar; and a cowl panel connected to said upper dash panel along the upper longitudinal edge of said upper dash panel and to said roof pillar; wherein said opening of said dashboard support member enables said roof pillar, said cowl panel and said upper dash panel to be simultaneously spot welded together at one or more points through said opening.

2. The construction as defined in Claim 1, wherein the opening of the dashboard support member is located at the front of said dashboard support member opposite the perpendicular surface, and wherein said cowl panel overlaps the region where said roof pillar faces said opening.

3. The constructiohn as defined in Claim 1, wherein said cowl panel and said roof pillar outer member overlap the opening of said dasboard support member.

4. The construction as defined in Claim 3, futher comprising a cowl reinforcement member which overlaps the region where said cowl panel and said pillar outer overlap the openings.

5. The construction as defined in Claim 1, wherein said opening comprises an upper opening and a lower opening, each being formed at the upper surface and the lower surface of the dashboard support member respectively.

6. The construction as defined in Claim 5, wherein said dashboard support member is substantially C-shaped in cross section.

7. The construction as defined in Claim 5, wherein the area of said opening of the upper surface is larger than the area of said opening of the lower region.

* * * * *